United States Patent Office 3,360,562
Patented Dec. 26, 1967

3,360,562
2-TERTIARYAMINOMETHYL-N-ACYLANILINES
Philip M. Carabateas, Schodack, N.Y., assignor to Sterling Drug Inc., New York, N.Y., a corporation of Delaware
No Drawing. Filed Aug. 17, 1964, Ser. No. 390,218
8 Claims. (Cl. 260—562)

ABSTRACT OF THE DISCLOSURE

2 - (N' - $R_1$ - N' - $R_2$ - aminomethyl) - N - R - N - Ac-anilinies where R and $R_1$ are each lower-alkyl, $R_2$ is lower-alkenyl, halo-(lower-alkenyl) or (lower-cycloalkyl)-(lower-alkyl), and Ac is lower-alkanoyl or lower-alkanesulfonyl, found to be antagonists of strong analgesics, are prepared by various means, e.g., by reacting an N-R-isatoic anhydride with a secondary amine, $HNR_1R_2$, reducing the resulting 2-$RNH$-N-$R_1$-N-$R_2$-benzamide, and acylating the resulting 2-(N'-$R_1$-N'-$R_2$-aminomethyl)-N-R-aniline.

This invention relates to compositions of matter of the class of anilines and, in particular, to 2-aminomethylaniline derivatives.

The invention in one aspect resides in the concept of a composition having a molecular structure in which a 2-aminomethylaniline is doubly substituted on the nuclear amino group by lower-alkyl and by lower-alkanoyl or lower-alkanesulfonyl, and, also, is doubly substituted on the other amino group by lower-alkyl and by lower-alkenyl, halo-(lower-alkenyl), phenyl-(lower-alkyl) or (lower-cycloalkyl)-(lower-alkyl). In another composition aspect of the invention, the molecular structure is as already stated except the nuclear (or anilino) amino group is monosubstituted by lower-alkyl.

Among the compounds of my invention are those of Formula I

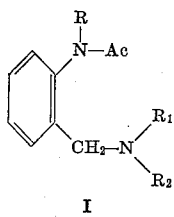

I where R is lower-alkyl, Ac is hydrogen, lower-alkanoyl or lower-alkanesulfonyl, $R_1$ is lower-alkyl, and $R_2$ is lower-alkenyl, halo-(lower-alkenyl), phenyl-(lower-alkyl) or (lower-cycloalkyl)-(lower-alkyl). Optionally, the benzene ring can be substituted in any of its four remaining positions by low-molecular-substituents, e.g., halo, lower-alkyl, lower-alkoxy, benzyloxy, lower-alkylmercapto, lower-alkanoylamino, nitro, hydroxy, lower-alkanoyloxy, and the like, and, where more than one substituent is present, they can be the same or different and they can be in any of the various position combinations relative to each other. The halo substituents include chloro, bromo, iodo and fluoro.

The term "lower-alkyl," as used herein, e.g., as the meaning for R and $R_1$ in Formula I, means alkyl radicals having from one to six carbon atoms and is illustrated by methyl, ethyl, n-propyl, isopropyl, n-butyl, 2-butyl, isobutyl, n-amyl, isoamyl, n-hexyl, 3-hexyl, and the like.

The term "lower-alkenyl," as used herein, e.g., as one of the meanings for $R_2$ in Formula I, means alkenyl radicals having from three to six carbon atoms and is illustrated by 2-propenyl (allyl), 2-methyl-2-propenyl, 3-methyl-2-butenyl, 3-butenyl, 2-hexenyl, and the like.

The term "halo-(lower-alkenyl)," as used herein, e.g., as one of the meanings for $R_2$ in Formula I, means halo-alkenyl radicals having from three to six carbon atoms and from one to two halo substituents (i.e., chloro, bromo, iodo and fluoro, preferably chloro and bromo), and is illustrated by —$CH_2CH$=$CHCl$, —$CH(CH_3)CH$=$CHCl$ —$CH_2CH$=$CHBr$, —$CH_2CH$=$CHI$, —$CH_2CH$=$CHF$, —$CH_2C(Cl)$=$CH_2$, —$CH_2C(Cl)$=$CHCl$ —$CH_2CH_2CH$=$C(Cl)CH_3$ —$CH_2CH_2C(Cy)$=$C(Cl)CH_3$, —$CH_2CH$=$C(Cl)_2$ —$CH_2CH$=$C(Br)_2$ —$CH_2C(Br)$=$C(CH_3)_2$, —$CH_2CH_2$=$C(Cl)_2$ —$CH_2CH_2CH_2CH$=$C(Cl)CH_3$ and the like.

The term "lower-alkanoyl," as used herein, e.g., as one of the meanings for Ac in Formula I, means alkanoyl radicals having from one to six carbon atoms, illustrated by formyl, ethanoyl (acetyl), n-propanoyl (propionyl), n-butanoyl (butyryl), 2-methyl-n-butanoyl, n-hexanoyl, and the like.

The term "lower-alkanesulfonyl," as used herein, e.g., as one of the meanings for Ac in Formula I, means alkanesulfonyl radicals having from one to six carbon atoms, illustrated by methanesulfonyl, ethansulfonyl, n-propanesulfonyl, 2-propanesulfonyl, n-butanesulfonyl, 2-butanesulfonyl, n-hexanesulfonyl, and the like.

The term "lower-cycloalkyl," as used in the term "(lower-cycloalkyl)-(lower-alkyl)," one of the meanings for $R_2$ in Formula I, means cycloalkyl radicals having from three to six carbon atoms, illustrated by cyclopropyl, cyclobutyl, cyclopentyl and cyclohexyl.

Compounds of Formula I are prepared by various procedures. A three-step procedure utilizing N-(lower-alkyl)-isatoic anhydrides is given as follows: In step (1) an N-(lower-alkyl)-isotoic anhydride (II) is reacted with a secondary amine of the formula H-$NR_1NR_2$ (III) to yield a 2 - (lower - alkyl)amino-N-$R_1$-N-$R_2$-benzamide (IV), which in step (2) is reduced, preferably with lithium aluminum hydride, to form a 2-(N'-$R_1$-N'-$R_2$-aminomethyl)-N-(lower-alkyl)aniline (Ia). In step (3) the aniline (Ia) is acylated to yield the corresponding N-acyl derivative (Ib). This procedure is illustrated structurally as follows:

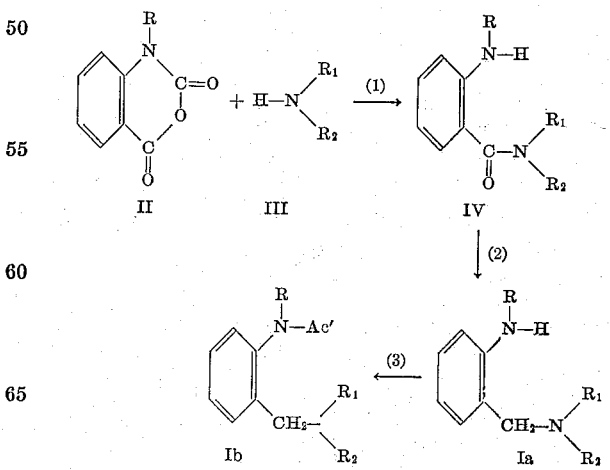

where R and $R_1$ have the meanings given above for Formula I, $R_2$ is lower-alkenyl, phenyl-(lower-alkyl) or (lower-cycloalkyl)-(lower-alkyl), and Ac' is lower-alkanoyl or lower-alkanesulfonyl, and the benzene ring can be substituted by groups which are unreactive under reaction conditions used in the procedure, e.g., lower-alkyl, lower-alkoxy, benzyloxy, and the like. Where $R_2$ is halo-(lower-alkenyl) or where the benzene ring has nuclear substituents sensitive to reaction conditions in individual steps, e.g., halo, nitro, or lower-alkylmercapto compounds in step (2) or hydroxy compounds in step (3), the compounds of the invention are readily obtained by other procedures described below.

Compounds of Formulas $Ia$ and $Ib$ having —OH substituents on the benzene ring are prepared by converting the corresponding compounds of Formula $Ia$ bearing an —$OCH_3$ or —$OCH_2$-phenyl substituent into the corresponding —OH compound, and then selectively acylating (step 3) with one molar equivalent quantity of acylating agent to form the compound of Formula $Ib$ having the —OH substituent.

Another procedure for the preparation of the compounds of my invention is as follows: A 2-[N-(lower-alkyl)-N-acylamino]-benzaldehyde (V) is reacted in step (1) with a primary amine of the formula $H_2N$—$R_2$ to yield corresponding N-$R_2$-2-[N'-(lower-alkyl)-N'-acylamino]-benzalamine (VI), which is reduced in step (2), preferably with sodium borohydride, to yield an N-$R_2$-2-[N'-(lower-alkyl)-N'-acylamino]-benzylamine (VII); and, in step (3) the benzylamine (VII) is alkylated, using a lower-alkyl halide or, optionally for compounds of Formula $Ia$ where $R_1$ is methyl, a mixture of formaldehyde and formic acid, to yield my N-$R_1$-N-$R_2$-2-(N'-(lower-alkyl)-N-Ac'-amino]-benzylamine of Formula $Ib$ where $R_1$ and $R_2$ have the meanings given for Formula I and Ac' (or "acyl") is lower-alkanoyl or lower-alkanesulfonyl. This procedure thus is suited for the preparation of compounds having reactive or sensitive nuclear substituents, e.g., nitro, halo or (lower-alkyl)mercapto, and of compounds where $R_2$ is halo-(lower-alkenyl). Illustrative of this procedure is the following preparation: 5-benzyloxy-2-(N - ethyl-N-propionylamino)benzaldehyde is reacted with 3-chloro-2-propenylamine to yield N-(3-chloro-2-propenyl)-5-benzyloxy - 2 - (N' - ethyl-N'-propionylamino)benzalamine, which is reduced with sodium borohydride to yield N-(3-chloro-2-propenyl)-5-benzyloxy-2-(N'-ethyl-N' - propionylamino)benzylamine, which, in turn, is reacted with a mixture of formaldehyde and formic acid to produce N-(3-chloro-2-propenyl) N-methyl - 5 - benzyloxy-2-(N'-ethyl-N'-propionylamino) benzylamine, alternative named N-[2-(N'-3-chloro-2-propenyl-N'-methylaminomethyl) - 4 - benzyloxyphenyl]-N-ethylpropionamide; treating the benzyloxy compound with concentrated hydrochloric acid yields the corresponding hydroxy compound, i.e., N-(3-chloro-2-propenyl) - N - methyl-5-hydroxy-2-(N'-ethyl-N'-propionyl-amino)benzylamine or N-[2-(N'-3-chloro-2-propenyl-N'-methylaminomethyl)-4-hydroxyphenyl] - N-ethylpropion-amide. The intermediate 5-benzyloxy-2-(N-ethyl-N-propionylamino)benzaldehyde is obtained in five steps as follows: reacting 5-benzyloxy-2-nitrobenzaldehyde with ethylene glycol to form the ethylene acetal of 5-benzyloxy-2-nitrobenzaldehyde, reducing the nitro group by catalytic hydrogenation using Raney nickel catalyst, reacting the resulting ethylene acetal of 2-amino-5-benzyloxy-benzaldehyde with propionic anhydride to form the ethylene acetal of 5-benzyloxy-2-propionylaminobenzaldehyde, alkylating the latter by reaction with ethyl iodide in the presence of potassium carbonate and treating the resulting 5-benzyloxy-2-(N-ethylpropionylamino)benzaldehyde ethylene acetal with concentrated hydrochloric acid to form the intermediate aldehyde.

Another procedure for the preparation of the compounds of my invention is given as follows: In step (1) a 2-methylnitrobenzene (IX) is reduced to a 2-methylaniline (X); in step (2) the aniline (X) is alkylated with a lower-alkyl halide or, for compounds where lower-alkyl is methyl, with a mixture of formaldehyde and formic acid, to yield an N-(lower-alkyl)-2-methylaniline (XI), which in step (3) is acylated to yield an N-(acyl) N-(lower-alkyl)-2-methylaniline (XII); in step (4) compound XII is brominated with N-bromosuccinimide to yield 2-[N-acyl-N-(lower - alkyl)amino]benzyl bromide (XIII); and, finally in step (5) the bromide (XIII) is reacted with a secondary amine of the formula $HNR_1R_2$ to produce an N-$R_1$-N-$R_2$-2-[N'-acyl-N-(lower-alkyl) amino]benzylamine ($Ib$) where $R_1$ and $R_2$ have the meanings given for Formula I and "acyl" is lower-alkanoyl or lower-alkanesulfonyl. Illustrative of this procedure is the following preparation: reduction of 5-chloro-2-methylnitrobenzene to yield 5-chloro-2-methylaniline; reaction of the aniline with formaldehyde and formic acid to yield N-methyl-5-chloro-2-methylaniline; acylation of the latter with propionyl chloride to produce N-methyl-N-propionyl-5-chloro-2-methylaniline; reaction of the latter with N-bromosuccinimide to yield N-methyl-N-propionyl-2-bromomethyl-5-chloroaniline; and, reacting the bromomethyl compound with N-ethylallylamine to produce N-[2 - (N'-allyl-N'-ethylaminomethyl)-5-chlorophenyl]-N-methylpropionamide.

The compounds of Formulas I, $Ia$ and $Ib$ are useful both in free base form and in acid-addition salt form and both forms are within the purview of the invention, and are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. In practicing my invention, I found it convenient to employ the hydrochloride salt. However, other appropriate pharmacodynamically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

The acid-addition salts are prepared preferably by reacting the free base and acid in an organic solvent, e.g., ethanol, in which case the salt separates directly or can be obtained by concentration of the solution.

Although pharmacodynamically acceptable salts are preferred, all acid-addition salts are within the scope of my invention. All acid-addition aslts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures.

The compounds of Formulas $Ia$ and $Ib$ have pharmacodynamic properties, e.g., the compounds of Formula $Ib$ are useful as antagonists of strong analgesic agents, e.g., meperidine, and the compounds of Formula $Ia$ are useful as anticonvulsants in addition to being useful as intermediates for the preparation of the acylated compounds of Formula $Ib$.

The molecular structures of the compounds of my invention are established by their mode of synthesis and corroborated by the correspondence of calculated and found values for the elementary analyses and by infrared (IR) spectral analyses.

The following examples will further illustrate the invention without, however, limiting it thereto.

EXAMPLE 1

The intermediate 2-alkylamino-N-$R_1$-N-$R_2$-benzamides (Formula IV) were prepared by reacting an N-(lower-alkyl)-isatoic anhydride (Formula II) with a secondary amine (Formula III), $HNR_1R_2$, illustrated as follows:

(A) *2-methylamino*-N-*cyclopropylmethyl* - N - *methylbenzamide* was prepared as follows: To a solution containing 67.6 g. of N-methylisatoic anhydride in 25 ml. of ether was added over a thirty minute period 35 g. of N-methylcyclopropylmethylamine. The resulting mixture was then heated on a steam bath for two hours, allowed to stand overnight, and taken up in 500 ml. of ether. The ether solution was filtered to remove a small amount of insoluble material, the filtrate evaporated in vacuo, and the resulting oily material distilled in vacuo to yield 77 g. of 2-methylamino-N-cyclopropylmethyl-N-methylbenzamide, B.P. 110–113° C. at 0.16 mm., $n_D^{30°}$=1.5671. A 10.9 g. portion of this amine was dissolved in ether, an excess of hydrogen chloride in ether was added, the resulting white gummy precipitate was triturated with acetone to yield a solid, and the solid was recrystallized from methyl ethyl ketone to yield 3.6 g. of 2-methylamino-N-cyclopropylmethyl-N - methylbenzamide hydrochloride, M.P. 149.0–150.0° C. (corr.).

The above intermediate N-methylcyclopropylmethylamine was prepared as follows: A suspension containing 26.4 g. of lithium aluminum hydride and 400 ml. of ether was stirred for ninety minutes to form a solution of the hydride. To this solution was added 61.8 g. of N-methylcyclopropanecarboxamide in 100 ml. of ether at a rate sufficient to cause refluxing. The reaction mixture was then stirred for five hours at 30° C. and allowed to stand overnight. To the reaction mixture was added carefully 27 ml. of water and the mixture was stirred for one hour, followed by addition of 60 g. of potassium hydroxide flakes and additional stirring for two hours. The solid was filtered off and washed with ether. The filtrate and the washings were combined and ether was removed by distillation to leave the oily amine product. In order to recover additional amine product which distilled with the ether, the ether distillate was extracted with dilute aqueous hydrochloric acid; the extract was concentrated in vacuo; the residue was azeotroped first with ethanol-benzene and then benzene to yield a white solid; the solid was taken up in 25 ml. of water; and the aqueous solution was treated with potassium hydroxide pellets with cooling and then extracted with ether. The ether extract was combined with the above oily amine product, dried over potassium hydroxide pellets and distilled. There was thus obtained 38.5 g. of N-methylcyclopropylmethylamine, B.P. 92–96° at 760 mm., $n_D^{28.5°}$=1.4210. For further purification, the amine was redistilled to yield 35.3 g. of purified product, B.P. 94–96° at 760 mm., $n_D^{29°}$=1.4209.

(B) *2-methylamino*-N-*allyl* - N - *methylbenzamide* was prepared as follows: 28.4 g. of N-methylallylamine was added to 55 g. of N-methylisatoic anhydride. After the vigorous reaction with the evolution of carbon dioxide, the mixture gradually became liquid and was then refluxed gently with stirring for about thirty minutes and then allowed to cool. The mixture was distilled in vacuo to yield 58.8 g. of the product, 2-methylamino-N-allyl-N-methylbenzamide, B.P. 119–121° C. at 0.2 mm., $n_D^{29.5°}$=1.5715.

(C) *2-ethylamino*-N-*allyl*-N-*methylbenzamide* was prepared following the procedure described in Example 1A using 50.4 g. of N-ethylisatoic anhydride, 75 ml. of ether, 21.3 g. of N-methylallylamine, and a reflux period of three hours. There was thus obtained 40.8 g. of the product, 2-ethylamino-N-allyl-N-methylbenzamide, B.P. 95–98° C. at 0.07 mm., $n_D^{28.5°}$=1.5596.

(D) *2-methylamino*-N-*allyl*-N-*ethylbenzamide* was prepared following the procedure described in Example 1A using 53 g. of N-methylisatoic anhydride, 50 ml. of ether and 29.8 g. of N-ethylallylamine, and a reflux period of four hours. There was thus obtained 61.1 g. of the product, 2-methylamino-N-allyl-N-ethylbenzamide, B.P. 102–105° C. at 0.1 mm., $n_D^{30°}$=1.5598.

Following the procedure described in Example 1A and using corresponding molar equivalent quantities of the appropriate Q-N-(lower-alkyl)-isatoic anhydride (II) and secondary-amine, $H-NR_1R_2$ (III), the compounds of Table A can be prepared.

TABLE A

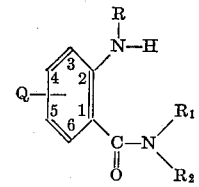

| Ex. | Q | R | $R_1$ | $R_2$ |
|---|---|---|---|---|
| 1G | 4-$C_2H_5$ | n-$C_4H_9$ | n-$C_4H_9$ | $CH_2CH=CH_2$ |
| 1H | 4,6-$(CH_3)_2$ | n-$C_6H_{13}$ | $C_2H_5$ | $CH_2CH=CH_2$ |
| 1I | 4-$OCH_3$ | $C_2H_5$ | n-$C_6H_{13}$ | $CH_2CH=CH_2$ |
| 1J | 5-$OC_4H_9$-n | $CH_3$ | $CH_3$ | $CH_2$-phenyl |
| 1K | 4-$OCH_3$ | $C_2H_5$ | $C_2H_5$ | $(CH_2)_3$-phenyl |
| 1L | 4-$CH_3$ | $C_2H_5$ | $CH_3$ | $CH_2$-cyclopropyl |
| 1M | H | $C_2H_5$ | $CH_3$ | $(CH_2)_2$-cyclohexyl |
| 1N | H | $C_2H_5$ | $C_2H_5$ | $CH_2C(CH_3)=CH_2$ |
| 1O | H | n-$C_3H_7$ | $C_2H_5$ | $CH_2CH_2CH=CH_2$ |
| 1P | H | $CH_3$ | n-$C_3H_7$ | $CH_2CH=CH_2$ |
| 1Q | H | $C_2H_5$ | $C_2H_5$ | $CH_2CH=CH_2$ |
| 1R | H | i-$C_3H_7$ | $C_2H_5$ | $CH_2CH=CH_2$ |
| 1S | H | $C_2H_5$ | $CH_3$ | $CH_2$-cyclobutyl |
| 1T | H | $CH_3$ | i-$C_4H_9$ | $CH_2CH=CH(CH_2)_2CH_3$ |
| 1U | 6-$CH_3$ | $C_2H_5$ | $C_2H_5$ | $CH_2CH=CH_2$ |
| 1V | 4-$OCH_3$ | $C_2H_5$ | $C_2H_5$ | $CH_2CH=CH_2$ |
| 1W | 5-$OCH_3$ | $C_2H_5$ | $CH_3$ | $CH_2CH=CH_2$ |
| 1X | 4-$OCH_2C_6H_5$ | $C_2H_5$ | $C_2H_5$ | $CH_2CH=CH_2$ |

The intermediates used to prepare the compounds of Table A are generally known and are prepared by conventional methods.

EXAMPLE 2

The 2 - (N' - $R_1$ - N' - $R_2$ - aminomethyl)-N-R-anilines (Formula Ia) of the invention were prepared by reducing, preferably with lithium aluminum hydride, the intermediate 2-RNH-N'-$R_1$-N'-$R_2$-benzamides (Formula IV) of Example 1, illustrated as follows:

(A) *2-(N'-cyclopropylmethyl* - N' - *methylaminomethyl)*-N-*methylaniline* was prepared as follows: A suspension containing 22.6 g. of lithium aluminum hydride in 250 ml. of tetrahydrofuran was stirred for one hour and then to this suspension was added at a rate to cause the solvent to reflux 66 g. of 2-methylamino-N-cyclopropylmethyl-N-methylbenzamide. The reaction mixture was then refluxed for six and one half hours and allowed to stand overnight. To the reaction mixture was added cautiously 23 ml. of water followed by 70 ml. of potassium sodium tartrate. The mixture was stirred for one hour and filtered, and the precipitate washed with tetrahydrofuran. The combined filtrate and washings were concentrated in vacuo, and the resulting oily residue was distilled in vacuo to yield 51.2 g. of the product, 2-(N'-cyclopropylmethyl-N'-methylaminomethyl)-N-methylaniline, B.P. 73–75° C. at 0.1 mm., $n_D^{32.5°}$=1.5360. A 10.2 g. sample of the product was treated with excess hydrogen chloride in ether to yield a white gummy material which was triturated with isopropyl alcohol to yield a solid. The solid was recrystallized from ethanol to yield 7.3 g. of 2-(N'-cyclopropylmethyl-N'-methylaminomethyl)-N-methylaniline dihydrochloride, M.P. 188.8–189.2° C. (corr.) with decomposition.

(B) 2-(N' - allyl - N' - *methylaminomethyl*)-N-*methyl-aniline* was prepared following the procedure described in Example 2A using 58.3 g. of 2-methylamino-N-allyl-N-methylbenzamide, 22.8 g. of lithium aluminum hydride and 300 ml. of tetrahydrofuran. There was thus obtained 44.4 g. of the product, B.P. 69–73° C. at 0.1 mm., $n_D^{29°}=1.5312$.

(C) 2-(N' - allyl - N' - *methylaminomethyl*)-N-*ethyl-aniline* was prepared following the procedure described in Example 2A using 40.5 g. of 2-ethylamino-N-allyl-N-methylbenzamide, 14.2 g. of lithium aluminum hydride and 300 ml. of tetrahydrofuran. There was thus obtained 33.3 g. of the product, B.P. 71–75° C. at 0.17 mm., $n_D^{29°}=1.5209$. A 10 g. portion of this compound was converted into 11.7 g. of its dihydrochloride, M.P. 180–182° C. with decomposition.

(D) 2-(N' - allyl - N' - *ethylaminomethyl*)-N-*methyl-aniline* was prepared following the procedure described in Example 2A using 60.2 g. of 2-methylamino-N-allyl-N-ethylbenzamide, 20.9 g. of lithium aluminum hydride and 400 ml. of tetrahydrofuran. There was thus obtained 47.5 g. of the product, B.P. 80–85° C. at 0.1 mm., $n_D^{28°}=1.5230$.

Following the procedure described in Example 2A and using corresponding molar equivalent quantities of the appropriate 2 - alkylamino-N'-$R_1$-N'-$R_2$-benzamide (IV) and lithium aluminum hydride, the compounds of Table B can be prepared.

TABLE B

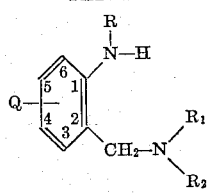

| Ex. | Q | R | $R_1$ | $R_2$ |
|---|---|---|---|---|
| 2E | 5-$C_2H_5$ | n-$C_4H_9$ | n-$C_4H_9$ | $CH_2CH=CH_2$ |
| 2Fg | 3,5-($CH_3$)$_2$ | n-$C_6H_{13}$ | $C_2H_5$ | $CH_2CH=CH_2$ |
| 2G | 5-$OCH_3$ | $C_2H_5$ | n-$C_6H_{13}$ | $CH_2CH=CH_2$ |
| 2H | 4-O$C_4H_9$-n | $CH_3$ | $CH_3$ | $CH_2$-phenyl |
| 2I | 5-$OCH_3$ | $C_2H_5$ | $C_2H_5$ | ($CH_2$)$_3$-phenyl |
| 2J | 5-$CH_3$ | $C_2H_5$ | $CH_3$ | $CH_2$-cyclopropyl |
| 2K | H | $C_2H_5$ | $CH_3$ | ($CH_2$)$_2$-cyclohexyl |
| 2L | H | $C_2H_5$ | $C_2H_5$ | $CH_2C(CH_3)=CH_2$ |
| 2M | H | n-$C_3H_7$ | $C_2H_5$ | $CH_2CH_2CH=CH_2$ |
| 2N | H | $CH_3$ | n-$C_3H_7$ | $CH_2CH=CH_2$ |
| 2O | H | $C_2H_5$ | $C_2H_5$ | $CH_2CH=CH_2$ |
| 2P | H | i-$C_3H_7$ | $CH_3$ | $CH_2CH=CH_2$ |
| 2Q | H | $C_2H_5$ | $CH_3$ | $CH_2$-cyclobutyl |
| 2R | H | $CH_3$ | i-$C_4H_9$ | $CH_2CH=CH(CH_2)_2CH_3$ |
| 2S | 3-$CH_3$ | $C_2H_5$ | $C_2H_5$ | $CH_2CH=CH_2$ |
| 2T | 5-$OCH_3$ | $C_2H_5$ | $C_2H_5$ | $CH_2CH=CH_2$ |
| 2U | 4-$OCH_3$ | $C_2H_5$ | $CH_3$ | $CH_2CH=CH_2$ |
| 2V | 5-$OCH_2C_6H_5$ | $C_2H_5$ | $C_2H_5$ | $CH_2CH=CH_2$ |

The 1-(lower-alkanoyl) and 1-(lower-alkanesulfonyl) derivatives of the compounds of Table B can be prepared following the procedure illustrated herein below in Examples 3–15, e.g., the 1-propionyl derivatives are prepared following the procedure of Example 6 using propionic anhydride and the appropriate 2 - (N'-$R_1$-N'-$R_2$-aminomethyl)-N-(lower-alkyl)aniline; for example, the reaction of propionyl anhydride with Example 2T yields N-[2-(N'-allyl-N'-ethylaminomethyl)-5-methoxyphenyl]-N-ethylpropionamide.

EXAMPLE 3

N-[2-(N' - allyl - N' - *methylaminomethyl*)*phenyl*]-N-*methylacetamide* was prepared as follows: To 19.0 g. of 2-(N'-allyl-N'-methylaminomethyl)-N-methylaniline was added 15.3 g. of acetic anhydride and the resulting solution was allowed to stand for three hours. To the reaction mixture was added 50 ml. of methanol and the resulting solution was concentrated in vacuo. The remaining oil was taken up in chloroform; the chloroform solution washed successively with 10% aqueous sodium hydroxide solution and water, and then distilled in vacuo to remove the chloroform. The remaining oil was distilled in vacuo to yield 15.7 g. of the product, N-[2-(N'-allyl-N' - methylaminomethyl)phenyl] - N - methylacetamide, B.P. 87–93° C. at 0.15 mm., $n_D^{29°}=1.5125$. The product was converted into its hydrochloride salt as follows: It was dissolved in 75 ml. of methyl ethyl ketone, an excess of hydrogen chloride in ether was added, and the mixture was boiled on a steam bath for twenty minutes to remove the excess hydrogen chloride and then allowed to cool. The crystalline solid that separated slowly on standing was collected and recrystallized twice from methyl ethyl ketone to yield 7.1 g. of N-[2-(N'-allyl-N'-methylaminomethyl)phenyl]-N-methylacetamide hydrochloride, M.P. 150.5–152.8° C. (corr.).

EXAMPLE 4

N-[2-(N' - allyl - N' - *methylaminomethyl*)*phenyl*]-N-*methylpropionamide* was prepared following the procedure described in Example 3 using 13.2 g. of 2-(N'-allyl-N'-methylaminomethyl)-N-methylaniline and 13 g. of propionic anhydride. The product in free base form distilled at 90–95° C. at 0.08 mm. and 12.0 g. of its hydrochloride salt, M.P. 163.4–165.0° C. (corr.), was obtained after one recrystallization from methyl ethyl ketone and ether.

EXAMPLE 5

N - [2 - (N' - *cyclopropylmethyl* - N' - *methylaminomethyl*)*phenyl*]-N-*methylpropionamide* was prepared as follows: To a solution containing 20.4 g. of 2-(N'-cyclopropylmethyl - N' - methylaminomethyl)-N-methylaniline dissolved in 150 ml. of chloroform was added slowly a solution containing 9.25 g. of propionyl chloride in 50 ml. of chloroform. After resulting mixture had stood for two hours, the chloroform was removed by distilling in vacuo. The remaining oil material was dissolved in water; the aqueous solution made alkaline with 35% aqueous sodium hydroxide solution; the alkaline solution extracted with ether; and, the ether extract washed with water and concentrated in vacuo to remove the ether. The remaining oil was dried azeotropically with benzene. The resulting oil was distilled in vacuo to yield 23.0 g. of the product, N - [2-(N'-cyclopropylmethyl-N'-methylaminomethyl)phenyl]-N-methylpropionamide, B.P. 103–107° C. at 1.0 mm., $n_D^{30°}=1.5209$. The product was purified by conversion into its picrate salt by treating 21.2 g. of it with 19 g. of picric acid dissolved in ethanol. The solution was concentrated to a volume of about 150 ml. and cooled. The resulting gummy precipitate crystallized and was recrystallized from ethanol to yield the picrate salt, M.P. 132–133° C. The picrate was reconverted into the free base as follows: It was heated with a mixture of 225 ml. of 10% aqueous hydrogen chloride and 150 ml. of benzene. The aqueous acidic solution was separated and then made alkaline with potassium carbonate and 35% aqueous sodium hydroxide solution. The alkaline solution was extracted with ether, the ether extract distilled in vacuo to remove the ether, and the remaining oil dried azeotropically by adding benzene and distilling it off in vacuo. The resulting oil was distilled in vacuo to yield 15.0 g. of purified N-[2-(N'-cyclopropylmethyl-N'-methylaminomethyl)phenyl]-N-methylpropionamide in free base form, B.P. 101–103° C. at 0.1 mm., $n_D^{29.5°}=1.5199$.

EXAMPLE 6

N-[2 - (N' - allyl - N' - *ethylaminomethyl*)*phenyl*]-N-*methylpropionamide* was prepared following the procedure described in Example 3 using 47.5 g. of 2-(N'-allyl-N'-ethylaminomethyl)-N-methylaniline and 58.5 g. of propionic anhydride. There was thus obtained 48.6 g. of N - [2 - (N' - allyl - N' - ethylaminomethyl)phenyl] - N-methylpropionamide, B.P. 108–112° C. at 0.1 mm., $n_D^{28°}=1.5078$. The picrate was prepared as in Example 5 using 43 g. of picric acid in 200 ml. of hot ethanol; the picrate melted at 119–121° C. after two recrystallizations from ethanol. The picrate was decomposed as in Example 5 to yield 35.1 g. of N-[2-(N'-allyl-N'-ethylaminomethyl)phenyl]-N-methylpropionamide in free base form, B.P. 110–111° C. at 0.2 mm., $n_D^{29°}=1.5070$.

EXAMPLE 7

N-[2-(N' - allyl - N' - methylaminomethyl)phenyl]-N-ethylpropionamide was prepared following the procedure described in Example 3 using 33.3 g. of 2-(N'-allyl-N'-methylaminomethyl)-N-ethylaniline and 25 ml. of propionic anhydride. There was thus obtained 30 g. of N-[2-(N' - allyl - N'-methylaminomethyl)phenyl]-N-ethylpropionamide, B.P. 107–110° C. at 0.3 mm., $n_D^{29.5°}=1.5069$. The product was converted into its p-toluenesulfonate as follows: To a solution containing the base in 100 ml. of ethanol was added 21.8 g. of p-toluenesulfonic acid monohydrate, the reaction mixture concentrated in vacuo to remove the solvent, the remaining oily material triturated with ethyl acetate to yield a white solid, and the solid recrystallized twice from methyl ethyl ketone to yield 31.3 g. of N-[2-(N'-allyl-N'-methylaminomethyl)-phenyl]-N-ethylpropionamide p-toluenesulfonate, M.P. 132.8–135.0° C. (corr.)

EXAMPLE 8

N-[2-(N' - allyl - N' - methylaminomethyl)phenyl]-N-ethylbutyramide is prepared following the procedure described in Example 5 using corresponding molar equivalent quantities of 2-(N'-allyl-N'-methylaminomethyl)-N-ethylaniline and butyryl chloride.

EXAMPLE 9

N-[2-(N'-allyl - N' - methylaminomethyl)-5-methoxyphenyl]-N-ethylpropionamide is prepared following the procedure described in Example 7 using corresponding molar equivalent quantities of 2-(N'-allyl-N'-methylaminomethyl)-5-methoxy-N-ethylaniline and propionic anhydride.

EXAMPLE 10

N-[2-(N'-allyl - N' - methylaminomethyl)-4-methoxyphenyl]-N-ethylpropionamide is prepared following the procedure described in Example 7 using corresponding molar equivalent quantities of 2-(N'-allyl-N'-methylaminomethyl)-4-methoxy-N-ethylaniline and propionic anhydride.

EXAMPLE 11

N-[2-(N' - allyl - N' - methylaminomethyl)-5-hydroxyphenyl]-N-ethylpropionamide is formed following the procedure described in Example 7 using molar equivalent quantities of 2-(N'-allyl-N'-methylaminomethyl) - 5 - hydroxy-N-ethylaniline and propionic anhydride. 2-(N'-allyl-N'-methylaminomethyl)-5-hydroxy-N - ethylaniline is prepared by demethylation of 2-(N'-allyl-N'-methylaminomethyl)-5-methoxy-N-ethylaniline by heating it with concentrated hydrobromic acid in glacial acetic acid.

EXAMPLE 12

N-[2-(N' - allyl - N' - methylaminomethyl)-4-hydroxyphenyl] - N - ethylpropionamide is formed following the procedure described in Example 7 using molar equivalent quantities of 2-(N'-allyl-N'-methylaminomethyl) - 4 - hydroxy-N-ethylaniline and propionic anhydride. 2-(N'-allyl-N'-methylaminomethyl)-4-hydroxy-N - ethylaniline is prepared by demethylation of 2-(N'-allyl-N'-methylaminomethyl)-4-methoxy-N-ethylaniline by heating it with concentrated hydrobromic acid in glacial acetic acid.

EXAMPLE 13

N-[2-(N' - allyl - N' - methylaminomethyl)phenyl]-N-ethylethanesulfonamide is prepared following the procedure described in Example 5 using 2-(N'-allyl-N'-methylaminomethyl)-N-ethylaniline and a molar equivalent quantity of ethanesulfonyl chloride in place of propionyl chloride. Similarly, using methanesulfonyl chloride, n-propanesulfonyl chloride, 2-butanesulfonyl chloride or n-hexanesulfonyl chloride in place of ethanesulfonyl chloride, there is obtained a corresponding N-[2'-(N'-allyl-N'-methylaminomethyl)phenyl]-N-ethylalkanesulfonamide.

EXAMPLE 14

N-[2-(N' - allyl - N' - methylaminomethyl)phenyl]-N-ethylformamide is prepared by adding a slight excess of chloral to a solution of 2-(N'-allyl-N'-methylaminomethyl)-N-ethylaniline and heating the reaction mixture for about fifteen minutes on a steam bath. The product is obtained by distilling off in vacuo the chloroform and excess chloral.

EXAMPLE 15

N-[2-(N' - allyl - N' - methylaminomethyl)phenyl]-N-ethylcaproamide is prepared following the procedure described in Example 5 using corresponding molar equivalent quantities of 2-(N'-allyl-N'-methylaminomethyl)-N-ethylaniline and caproyl chloride.

EXAMPLE 16

N-[2-(N'-3-chloro-2-propenyl - N' - methylaminomethyl)-5-chlorophenyl]-N-ethylacetamide is prepared by reacting N-(2-bromomethyl-5-chlorophenyl)-N-ethylacetamide with N-methyl-3-chloro-2-propenylamine. The intermediate N-(2-bromomethyl-5-chlorophenyl)-N - ethylacetamide is obtained in two steps by alkylating 5-chloro-o-acetotoluidide with ethyl iodide and then brominating the resulting N-ethyl-5-chloro - o - acetotoluidide with N-bromosuccinimide.

EXAMPLE 17

N-[2-(N'-chloro-2-propenyl - N' - methylaminomethyl)phenyl] - N - ethylpropionamide is prepared by reacting N-(2 - bromomethylphenyl) - N - ethylpropionamide with N-methyl-3-chloro - 2 - propenylamine. The intermediate N-(2-bromomethylphenyl) - N - ethylpropionamide is obtained by brominating N-ethyl-o-propionotoluidide with N-bromosuccinimide.

Compounds of Formula Ib prepared as described in the foregoing examples were found to be antagonists of strong analgesics. Thus, when tested in rats by a modified D'Armour-Smith test procedure, they were found to be antagonists of the analgesic activity of meperidine. In this test procedure, when the compounds of this invention were administered prior to or simultaneously with administration of meperidine, the expected analgesic effect of the latter was decreased with increasing dosage levels of the former to a point where no analgesic effect was obtained. And when the new compounds were administered after the administration of meperidine, the analgesic effect was diminished or terminated, depending on the dosage levels involved. For example, compounds of this invention, each in the form of a aqueous solution of an acid-addition salt, were administered subcutaneously to rats to determine the dosage level, in terms of weight of antagonist per kilogram of body weight of the animal, which caused reduction of the analgesic effect of a 60 mg./kg. dose of meperidine hydrochloride by approximately 50 percent ($AD_{50}$). Illustrative $AD_{50}$ values are 32 mg./kg. for N-[2 - (N'-allyl-N'-methylaminomethyl)phenyl]N-methylacetamide as its hydrochloride, 20 mg./kg. for N-[2-(N'-allyl-N'-methylaminomethyl)phenyl]-N - methylpropionamide as its hydrochloride, and 3.8 mg./kg. for N-[2-(N'-allyl-N'-methylaminomethyl)phenyl]-N - ethylpropionamide as its p-toluenesulfonate.

Compounds of Formula Ia have been tested by standard pharmacological evaluation procedures and found to possess anticonvulsant properties, for example, they protect against metrazol induced convulsions in mice, e.g., the calculated dose ($ED_{50}$) of 2-(N'-cyclopropylmethyl-N'- methylaminomethyl)-N-methylaniline as its dihydrochloride for protecting 50% of the animals against convulsions induced by metrazol (50 mg./kg. i.v.) was found to be 39.2±9.3 mg./kg. by intraperitoneal administration.

I claim:
1. A compound of the formula

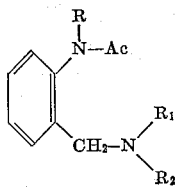

where R is lower-alkyl, Ac is a member selected from the group consisting of lower-alkanoyl and lower-alkanesulfonyl, $R_1$ is lower-alkyl, and $R_2$ is a member selected from the group consisting of lower-alkenyl, halo-(lower-alkenyl) and (lower-cycloalkyl)-(lower-alkyl).

2. A compound of the formula

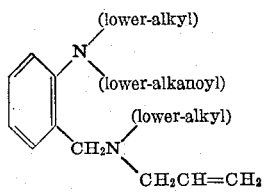

3. A compound of the formula

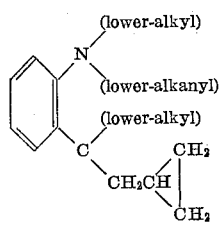

4. N-[2-(N'-allyl-N'-methylaminomethyl)phenyl] - N-methylacetamide.
5. N-[2-(N'-allyl-N'-methylaminomethyl)phenyl] - N-methylpropionamide.
6. N-[2 - (N' - cyclopropylmethyl - N' - methylaminomethyl)phenyl]-N-methylpropionamide.
7. N-[2-(N'-allyl-N' - methylaminomethyl)phenyl - N-ethylpropionamide.
8. N-[2-(N'-allyl-N' - ethylaminomethyl)phenyl] - N-methylpropionamide.

References Cited

UNITED STATES PATENTS 3,133,919 5/1964 Kuehne _____ 260—244
3,192,213 6/1965 Krapcho _____ 260—562

FOREIGN PATENTS 606,037 10/1948 Great Britain.

OTHER REFERENCES

Hall et al.: Jour. Chem. Soc. (London), 1945, p. 696.

JOHN D. RANDOLPH, *Primary Examiner.*

WALTER A. MODANCE, *Examiner.*

N. TROUSOF, *Assistant Examiner.*

UNITED STATES PATENT OFFICE
CERTIFICATE OF CORRECTION

Patent No. 3,360,562                  December 26, 1967

Philip M. Carabateas

It is certified that error appears in the above identified patent and that said Letters Patent are hereby corrected as shown below:

Column 2, line 13, "$-CH_2CH_2C(Cy)=C(Cl)CH_3$" should read -- $-CH_2CH_2C(Cl)=C(Cl)CH_3$ --; line 41, "$H-NR_1NR_2$" should read -- $H-NR_1R_2$ --; lines 60 to 68, formula Ib should appear as show below:

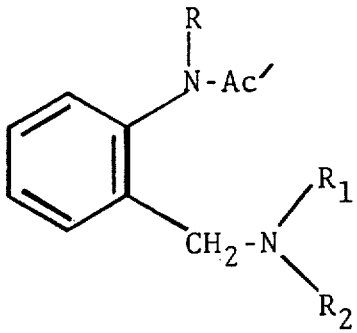

Column 3, line 29, "$N-R_1-N-R_2-2-(N'-$" should read -- $N-R_1-N-R_2-2-[N'-$ --. Column 8, line 1, "50 mil." should read -- 50 ml. --; line 49, "1.0 mm." should read -- 0.1 mm. --. Column 10, line 37, "$N-[2-(N'-chloro-$" should read -- $N-[2-(N'-3-chloro-$ --. Column 12, lines 2 to 10, the formula should appear as shown below:

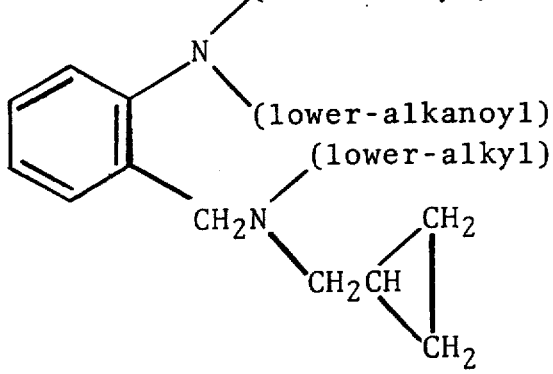

Column 12, line 17, ")phenyl-N-" should read -- )phenyl]-N- --.

Signed and sealed this 24th day of February 1970.

(SEAL)
Attest:

EDWARD M. FLETCHER, JR.
Attesting Officer

WILLIAM E. SCHUYLER, JR
Commissioner of Patents